Dec. 9, 1952  R. F. WILD ET AL  2,621,298
CONTROL SYSTEM
Filed June 18, 1946  3 Sheets-Sheet 1

INVENTORS.
RUDOLF F. WILD
CLARENCE A. DYER
JAMES C. MOUZON
BY WALTER P. WILLS

E. Wellford Moan
ATTORNEY.

Dec. 9, 1952 R. F. WILD ET AL 2,621,298
CONTROL SYSTEM
Filed June 18, 1946 3 Sheets-Sheet 2

*INVENTORS.*
RUDOLF F. WILD
CLARENCE A. DYER
JAMES C. MOUZON
WALTER P. WILLS
BY
*E. Wellford Mason*
ATTORNEY.

Dec. 9, 1952 R. F. WILD ET AL 2,621,298
CONTROL SYSTEM
Filed June 18, 1946 3 Sheets-Sheet 3

INVENTORS.
RUDOLF F. WILD
CLARENCE A. DYER
JAMES C. MOUZON
WALTER P. WILLS
BY
E. Wellford Moson
ATTORNEY.

Patented Dec. 9, 1952

2,621,298

UNITED STATES PATENT OFFICE 2,621,298

CONTROL SYSTEM

Rudolf F. Wild, Philadelphia, Clarence A. Dyer, Glenside, James C. Mouzon, Wyndmoore, and Walter P. Wills, Philadelphia, Pa., assignors, by mesne assignments, to Minneapolis-Honeywell Regulator Company, Minneapolis, Minn., a corporation of Delaware Application June 18, 1946, Serial No. 677,452

13 Claims. (Cl. 250—43.5)

The present invention relates to spectrographs and, more particularly, to apparatus for automatically controlling and adjusting the timing and sequence of operation of a spectrographic analyzing apparatus.

The control system with which the present invention is concerned is used in conjunction with a two channel infrared absorption spectrograph capable of producing thermocouple E. M. F.'s in the order of a fraction of a microvolt in accordance with radiant energies in a reference channel and a sample channel in a spectrograph. The purpose of the instrument is to record the ratios of the radiant energies in the two channels.

Spectrographs used for this type of spectroscopy include a scanning device for radiation wave length selection, an adjustable entrance slit for controlling the amount of energy entering the spectrograph and a shutter arrangement for intercepting the energy normally incident upon the thermocouples when adjusting the energy measuring or recording equipment for zero reading. Since the energy emitted by the spectrograph radiation source differs for different wave lengths of radiation, it is necessary to readjust the slit width either continuously or at intervals during traversal of the spectrum. If it is adjusted at intervals, the scanning operation must be stopped and the slit width readjusted until the energy measured in the reference channel is returned to a predetermined value.

Two preamplifiers are provided for measuring the minute E. M. F.'s developed by the reference and sample thermocouples. These amplifiers are of the direct current type and subjected to thermal drift. It is therefore necessary to make drift compensating or rebalancing operations at regular intervals. The direct current input to the preamplifiers is converted into alternating current before amplification and reconverted to direct current after amplification. Since the preamplifier output current contains an appreciable amount of A. C. ripple, it is necessary to provide filters in the output circuits of these amplifiers.

For recording, the output voltage of the spectrograph reference channel is applied across a slidewire provided in the recorder proper, while the output voltage of the sample channel is developed across a resistor. One terminal of the resistor is connected to one terminal of the slidewire while the other terminal of the resistor is connected through an amplifier in the recorder to the slider of the slidewire. The recorder amplifier acts as a null-balance detector and the recorder balancing motor which is connected to the power output of the amplifier drives the slider until it picks off a portion of the slidewire voltage equal to the resistor voltage. A pointer and pen connected to the slider respectively indicates and records the ratio of sample channel to reference channel energies.

The same operating principle is used for the various automatic control operations. The recorder amplifier is used as a null detector in different circuits and different balancing motors are switched into its power output circuit. For slit width control the amplifier is connected between the slidewire and a resistor carrying an adjustable amount of battery current, while a balancing motor geared to the slit width control arrangement is connected to the amplifier power output. The slit width is then automatically readjusted until the slidewire voltage equals the resistor voltage, which latter serves as the reference voltage.

For rebalancing of a preamplifier, the recorder amplifier is connected to the preamplifier output and a rebalancing motor geared to a variable resistance in the preamplifier is connected to the recorder amplifier power output. The balancing circuit is then automatically adjusted until the preamplifier output is zero.

Switching of the motors and control of the operation of the shutters and the recorder proper is accomplished by means of cam operated switches, while switching of the recorder amplifier circuit is done by means of a rotary switch that is controlled by a cam operated switch.

From the above it will be seen that the following operating schedule evolves during the periodic control or rebalancing cycles between the recording cycles. The spectrograph scanning motor must be stopped, then the recorder motor. The width of the entrance slit of the spectrograph is then adjusted. Next a shutter is closed in front of the entrance slit and the preamplifiers are sequentially rebalanced. The recorder is then started, the shutter is opened and the scanning motor is started. A record will then be made until the control cycle is repeated.

In another embodiment of the invention the same sequence of operation is used during the control cycle except that the width of the entrance slit is not adjusted at that time. In this embodiment there is provided an additional amplifier which is continuously responsive to variations in the energy output of the energy source. The output of this additional amplifier operates continuously to control a slit width adjusting motor. Thus the slit width is adjusted continuously during the recording operation rather than intermittently during control cycles. This is of advantage when particularly precise measurements are being made.

It is an object of the present invention to provide automatic means to perform the control cycle of a spectrograph automatically and at regular intervals. It is a further object of the invention to provide apparatus to readjust automatically the various components of a spectrograph at regular intervals so that the instrument will continue to perform with a high degree of accuracy throughout the time that a record is being made.

It is a further object of the invention to provide means to adjust continuously the energy level of the input to a spectrograph.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
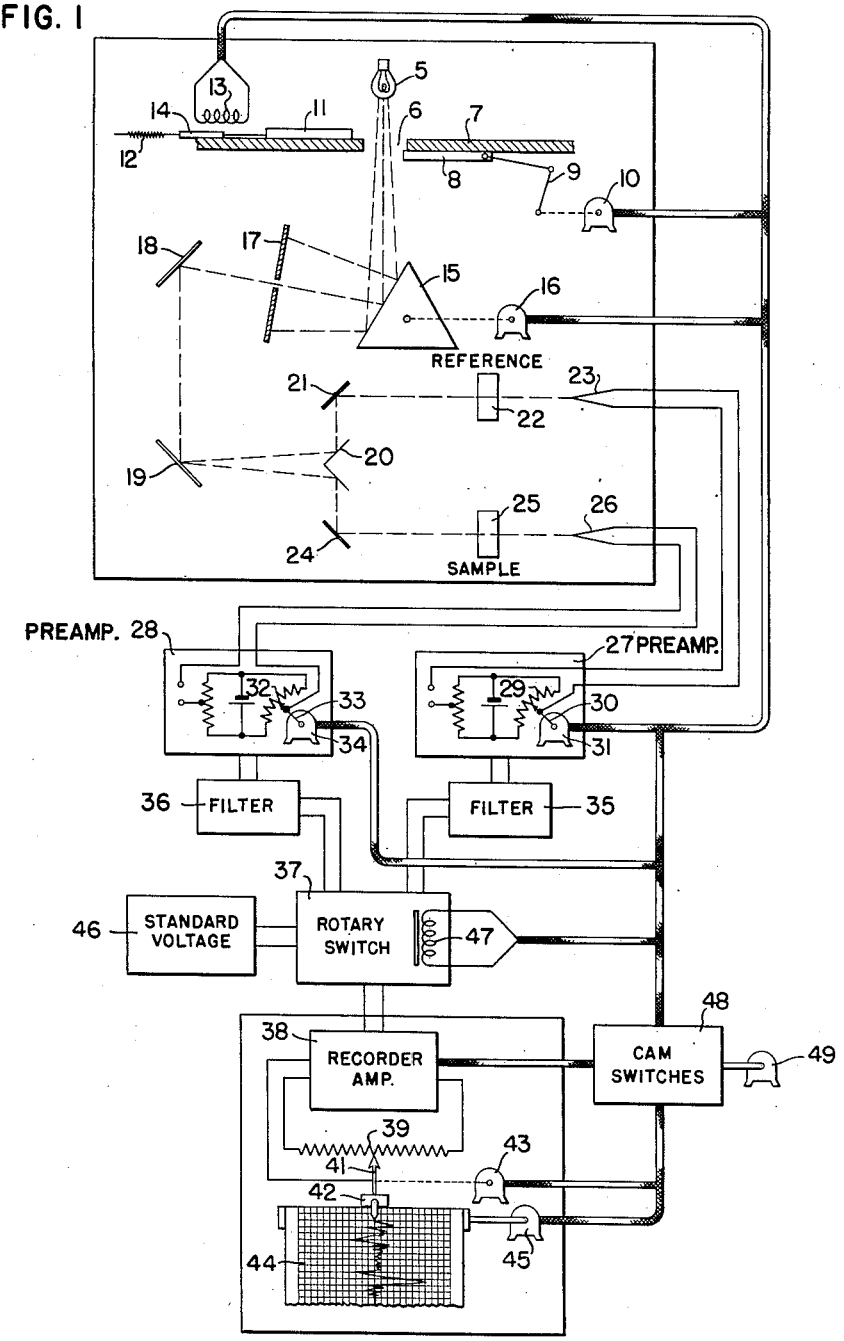
Figure 1 is a diagrammatic view of the component parts of a spectrograph.

Referring first to Figure 1, there is shown diagrammatically the component parts of a spectrograph of a type with which the present invention is concerned. An infrared radiation source is shown at 5, a portion of the energy of which is directed through a slit 6 formed in a partition 7. The width of this slit may be adjusted by a baffle 8 that is slid back and forth in front of the slit by a linkage 9 which is driven from a reversible motor 10. Radiation may be cut off entirely from passing through this slit by a shutter 11 that is biased in an open direction by a spring 12 and which may be moved to the right to close the slit by cooperation between a solenoid 13 and an armature 14. Rays from the source are directed against a scanning prism 15 that is rotated in a suitable manner by a reversible motor 16.

As radiation is refracted by the prism, rays of various wave lengths pass successively through an opening in a shield 17 and impinge upon a mirror 18. These rays are reflected to a second mirror 19 and to a third mirror 20, and the latter splits the rays so that a portion thereof is directed toward a mirror 21 that reflects said portion of the rays through a cell 22. This cell is filled with a standard solution so that the energy from the source passing through this solution impinges upon a standard thermocouple 23. Other rays from the mirror 20 are directed by a mirror 24 through a second cell 25 after which they impinge upon a sample thermocouple 26. Cell 25 is filled with a material whose spectroscopic analysis is to be obtained. The minute electromotive forces which are developed by thermocouples 23 and 26 are amplified by preamplifiers 27 and 28 respectively. These amplifiers are of a standard direct current type which converts the direct current E. M. F. into alternating current, amplifies the alternating current and reconverts it into direct current. Each of these amplifiers is subject to thermal drift and must therefore be provided with some means to recalibrate it. Therefore, amplifier 27 is provided with a recalibrating slidewire 29 across which a contact 30 is moved by a calibrating motor 31. In like manner the amplifier 28 is provided with a recalibrating slidewire 32 across which a contact 33 is moved by a recalibrating motor 34.

The outputs from the amplifiers 27 and 28 are passed through filters 35 and 36 respectively to suitable contacts in a rotary switch 37. Also connected with the rotary switch is an amplifier 38 which forms part of a recording instrument. This amplifier may be of the type in which a direct current input is converted to alternating current and amplified, and is preferably of the type disclosed in the W. P. Wills application Serial Number 421,173, filed December 1, 1941, and now Patent No. 2,423,540 of July 8, 1947. The output from this amplifier is used to run one of several motors depending upon the circuit in which the amplifier is then connected. This amplifier is provided with a slidewire 39 across which a contact 41 may be moved. Connected with the contact is a pen 42, the contact and pen being driven together by a reversible motor 43. As shown herein, the pen moves across a chart 44 that is driven at a constant rate of speed by a motor 45. Also connected with the rotary switch is a source of standard voltage 46 that is used in connection with one of the preamplifiers to adjust the position of baffle 8 so that a constant energy output may be obtained from the radiation source regardless of which part of the spectrum is being directed through the slit in shield 17 and against the thermocouples. The rotary switch may be a conventional solenoid operated switch that is moved from one position to another by a solenoid 47.

All of the various motors that have been mentioned, the shutter operating solenoid and the rotary switch solenoid are connected to a series of cam operated switches 48 that are actuated in a predetermined sequence by a series of cams in any conventional manner. As shown herein the cam operated switch mechanism is driven by a constant speed motor 49. The speed of this motor may be so selected that the switching operations are carried out with a sufficient time interval between them.

Figure 3:
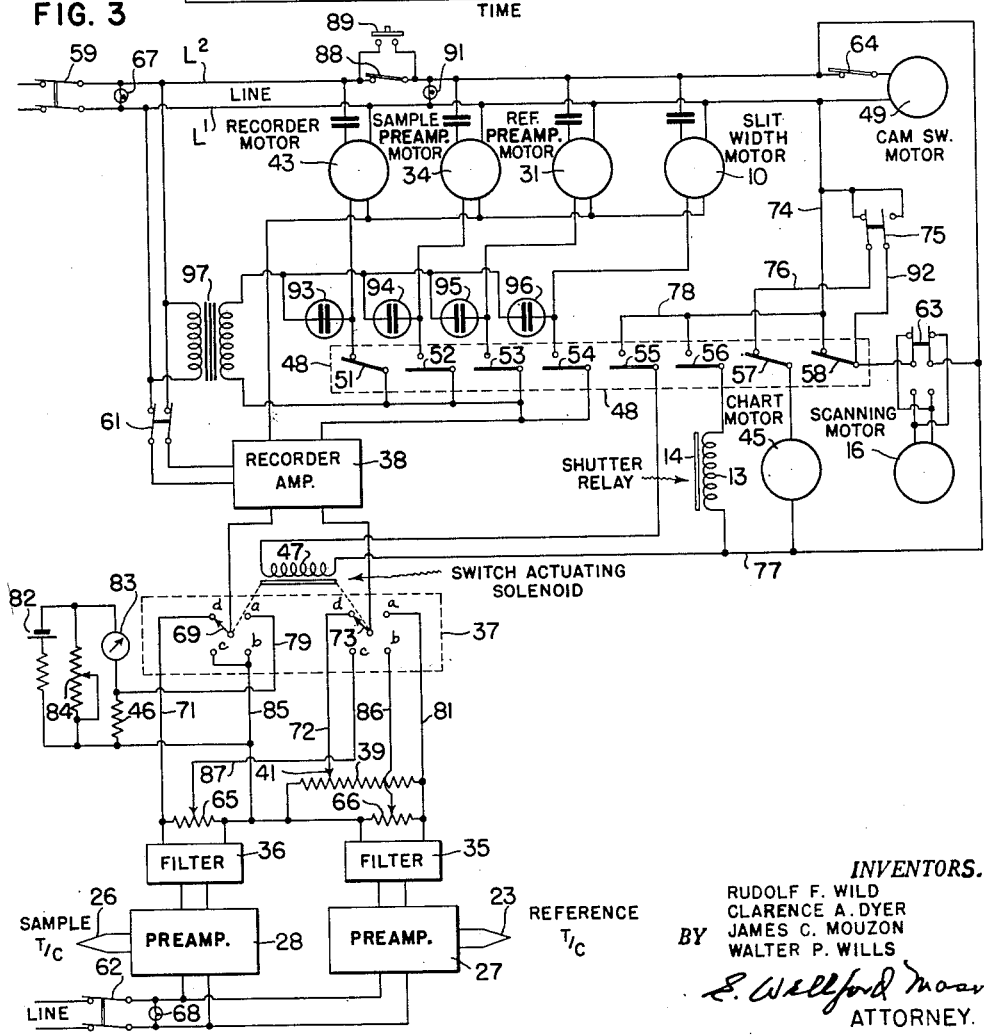
Figure 3 is a wiring diagram showing how the various parts of the spectrograph are connected electrically to each other.

In the operation of the spectrograph, the energy received from source 5 is passed through the cell 22 that contains a reference material or a standard product with which it is desired to compare an unknown sample. The energy passing through the standard product impinges upon the thermocouple 23 to produce a standard or reference E. M. F. A portion of the same energy is also passed through the cell containing the unknown sample. The energy of the source passing through this sample impinges upon the thermocouple 26 to produce the E. M. F. that varies with the analysis of the sample. Since the energy passed through both cells will vary with the wave length of that portion of the spectrum being directed upon it, it is customary to measure the ratio of the energies transmitted by the two cells. The outputs of the thermocouples are so small that they must be amplified before they are opposed to each other. This is the purpose of the preamplifiers. The output of the preamplifier connected to the sample thermocouple is applied across a resistor 65, as shown in Figure 3. The output of the preamplifier connected to the reference thermocouple is applied across the slidewire 39. By connecting the output across the resistance 65 in opposition to a variable portion of the output across the slidewire to the input of the recorder amplifier, the difference in outputs may be detected. The output of the recorder amplifier is used to move the contact across the slidewire until the difference is zero. The position of the contact and the recording element connected therewith is then an indication of the ratio of the energy impinging on the two thermocouples and an indication of the analysis of the sample.

Figure 2:
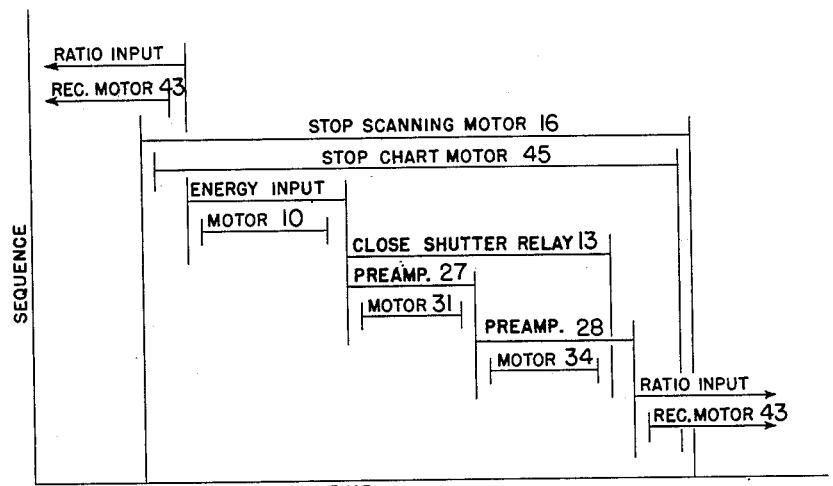
Figure 2 is a drawing showing the sequence of operation of the control cycle of a spectrograph.

Before the manner in which the various circuits are connected to each other is discussed, it is believed that a discussion of the sequence of operation of the instrument will be helpful. Reference is accordingly made to Figure 2.

As was above mentioned, the energy emitted by the infrared radiation source 5, which is the spectrograph radiation source, varies for different wave lengths of radiation. In other words, as the scanning prism is rotated to move the spectrum across the slot in shield 17 the energy of the radiation passing through the slot varies from one end of the spectrum to the other. It is necessary therefore to readjust the width of slit 6 at intervals during the transversal of the spectrum. For this purpose the scanning operation must be stopped in the modification of Figure 1 and the slit width readjusted until the energy measured in the reference channel is readjusted to a predetermined value. Also from time to time the preamplifiers need readjustment or rebalancing. These operations may take place at substantially the same time that the slit width is being adjusted. The time occupied by adjustments may be called a control cycle and this control cycle takes place in between recording cycles when a record is being made of the ratio of the output of the sample thermocouple with respect to the output of the reference thermocouple.

For example, just before the recording motor 43 is stopped, the scanning motor 16 is stopped and the chart motor 45 is stopped so that when the recording cycle is again started no part of the record will be lost. The recording motor 43 is stopped prior to the time that the input to the recording amplifier is turned off. This is shown in the upper left hand portion of Figure 2 in which the sequence of the events during a control cycle is indicated against time moving from top to bottom and left to right of the figure. Simultaneously with a change in circuit that disconnects the ratio input from the recording amplifier, the energy input from the radiation source as it is passed through the standard cell 22 and impinges upon standard thermocouple 23 is connected in opposition to the standard voltage source 46 to the input of the recorder amplifier. Shortly thereafter the output of the recorder amplifier is applied to the slit width adjusting motor 10. This motor is accordingly energized in a direction to adjust the slit width so that the energy from the source is equal to a standard value. Motor 10 is then disconnected from circuit and shortly thereafter the circuits are changed so that the energy input through the standard thermocouple is disconnected from the recorder amplifier and the shutter 11 is moved across slit 6 to cut off energy to the two preamplifiers. Simultaneously with this, the output of preamplifier 27 is connected to the input of the recorder amplifier and shortly thereafter the output of the recorder amplifier is connected to motor 31. This motor is adjusted until the output from the amplifier is zero. After this the circuits are so changed that the output from preamplifier 27 is disconnected and the output from preamplifier 28 is connected to the input of the recorder amplifier. Shortly thereafter, the output of the recorder amplifier is connected to motor 34 and this motor is energized for rotation in a direction to adjust resistance 32 until the output from preamplifier 28 is zero. Motor 34 is then disconnected from the recorder amplifier. At this time the shutter 11 is moved back from in front of slit 6 so that energy can impinge upon the thermocouples 23 and 26 to begin to heat these thermocouples up. The output from preamplifier 28 is then disconnected from the recorder amplifier and the ratio output is connected to this amplifier. Shortly thereafter the recording motor 43 is connected to the output of the recorder amplifier. When this occurs chart motor 45 can be started and the scanning motor 16 can be started to again begin a recording cycle. From the above it will be seen that a control cycle is interjected into the recording cycle at various times, and that the control cycle actually starts when the scanning motor is stopped and is completed when the scanning motor is again started. The frequency with which these control cycles take place is determined by the speed of motor 49. The sequence of operation is controlled by properly shaping cams that are used to operate the switches. This can be done in any conventional manner by one skilled in the art after the proper timing and sequence of the control cycle has been determined, but is preferably accomplished by a timing mechanism of the type disclosed in the Tilton application Serial Number 670,390, filed May 17, 1946.

In Figure 3 there is shown a wiring diagram of the connections between the various components of the instrument and the switches by means of which the above mentioned sequence of operation may be carried out. The recording motor, the motors for rebalancing the preamplifiers and the slit width motor are rotary field, two phase induction motors each having one field connected across the line through a condenser, with the other field being energized in one phase or the opposite phase from the output of the recording amplifier through suitable switches. The chart motor, the scanning motor for driving the prism and the motor for driving the cam switches may be any desired type of alternating current motor that is of a constant speed. Preferably, the scanning motor is a reversible one whereas the chart motor and the switch motor do not need to be reversible.

The cam operated switch mechanism 48 includes eight switches that are numbered 51 to 58 inclusive. These switches serve to connect the various motors as well as the shutter relay and the rotary switch actuating solenoid across the line in a sequence to perform the above mentioned operations. The solenoid operated switch 37 is shown as having four stations a, b, c, d, by means of which one or the other of the energy input devices can be connetced to the recorder amplifier so that the adjustment of the various components of the instrument can be carried out.

The various switches in the diagram are shown in the positions that they assume during a normal operation of the device when a record is being made of the ratio between the energy inputs to the two thermocouples 23 and 26. It is noted that a line switch 59 supplying current to the various motors is closed and a switch 61 supplying current to the recorder amplifier is closed. There is also provided a line switch 62 through which current is supplied to the preamplifiers. Located in the circuit to the scanning motor 16 is a reversing switch 63 that may be thrown in one direction or the opposite direction depending upon how it is desired to have the prism rotated. The rotary switch is in its position to connect the output resistance 65 of preamplifier 28 in opposition to a portion of the ratio slidewire 39. It is noted that there is also a load resistance 66 in parallel with the slidewire 39 in the output side of preamplifier 27. It is also noted that there is provided a signal light 67 to indicate when power is provided to the motors and recorder amplifier 38 and that there is a further signal light 68 to indicate when power is supplied to the preamplifiers.

An inspection of the drawing will show that the ratio circuit extends from the recorder amplifier to contact 69 of the rotary switch, through wire 71 to the left end of the resistor 65, through the resistor to the left end of the slidewire 39 and from there through contact 41, wire 72 and contact 73 of the rotary switch, back to the recorder amplifier. Switch 51 from the output of the recorder amplifier is closed so that the other field of recorder motor 43 is energized. Switches 57 and 58 are also closed to energize the chart motor and the scanning motor. The circuit for the chart motor extends from line L' through wire 74, a switch 75 and wire 76 to switch 57. From there it goes to the chart motor and through wire 77 back to line L². The circuit for the scanning motor goes from line L', wire 74 and switch 58 through the reversing switch 63 and back through wire 77 to line L². This position of the various components of the instrument continues during the time that a record is being made of the ratio input.

Since motor 49 is running at all times the cam switches will be operated to produce the control sequence. With reference to Figures 2 and 3 it will be seen that, just prior to the time the ratio input and the recording motor circuits are open, switch 58 will be opened to stop the scanning motor. Shortly thereafter switch 57 will be opened to stop the chart motor. Then switch 51 will be opened to stop the recorder motor. Immediately after that switch 55 will be closed momentarily to energize solenoid 47. The circuit for this extends from line L' through wire 74, wire 78, switch 55 to solenoid 47 and from there through wire 77 to line L². As the solenoid is energized it will step the switch from position $d$ to position $a$. Therefore the recorder amplifier will be connected so that the output of resistance 66 will be opposed to that of resistance 46 across which a standard voltage is impressed. The circuit for this will extend from the recorder amplifier through switch contact 69 and wire 79 to resistance 46. From resistance 46 a circuit extends to the left end of resistance 66 and through wire 81 to contact 73 of the rotary switch and the recorder amplifier. It is noted that the standard voltage is supplied from a battery 82 through a meter 83. The voltage applied across resistance 46 may be adjusted by a variable resistance 84. Shortly after the solenoid actuated switch is energized, switch 54 will be closed to connect the recorder amplifier output to the other field of slit width control motor 10. Thereafter if the energy output from radiation source 5 has changed due to the changing portion of the spectrum being impressed upon thermocouple 23, motor 10 will be energized for rotation in a direction to move shutter 8 to a position so that the proper amount of radiation will be let through slit 6. The motor 49 is rotating at such a speed that sufficient time is permitted for the adjustment of baffle 8 to take place. Switch 54 will then be opened to disconnect the meter 10.

After this has occurred switch 55 is opened and shortly thereafter switch 55 is again momentarily closed. This energizes solenoid 47 to shift the rotary switch from position $a$ to position $b$. Simultaneously switch 56 is closed to energize solenoid 13 and move shutter 11 across the slit 6 so that no radiation will be applied to the thermocouples. During this time preamplifier 27 is connected to the input of the recorder amplifier through a circuit including switch contact 69 and wire 85 to the left end of resistance 66. Only a portion of this resistor is necessary for the rebalancing operation so that the circuit extends from a contact tapped off a portion of this resistor through wire 86 to contact 73 and the recorder amplifier. Immediately after the solenoid switch has been adjusted to station $b$ switch 53 is closed to energize the field of motor 31 through the output of the recorder amplifier. If the output of preamplifier 27 across the resistance 66 is any other value than zero, motor 31 will be energized for rotation in the proper direction to move contact 30 across the resistance 29 until the preamplifier is rebalanced so that its output is zero when no radiation is impinging upon thermocouple 23.

After a predetermined time depending upon the speed of rotation of motor 49, switch 53 is opened and switch 55 is again momentarily closed to energize solenoid 47. The rotary switch is then moved to its position $c$. This connects a portion of the output resistor 65 to the recorder amplifier. The circuit for this is from the recorder amplifier through switch contact 69 and wire 85 to the right end of resistor 65. The circuit extends through a portion of this resistor to the contact which is connected by wire 87 to contact 73 of the rotary switch and the recorder amplifier. Immediately after this takes place switch 52 is closed to connect motor 34 to the output of the recorder amplifier. If the output of preamplifier 28 is not zero, motor 34 will be energized for rotation to move contact 33 along resistance 32 in the proper direction to rebalance this preamplifier. Switch 52 is then opened to disconnect motor 34. Shortly thereafter switch 56 is opened to de-energize solenoid 13 and permit spring 12 to move the shutter from in front of slit 6. Radiation can then be transmitted to the thermocouples. After this takes place and while the thermocouples are warming up switch 55 is again momentarily closed to energize solenoid 47 so that the rotary switch will be moved back to its position $d$. Switch 51 is then closed and the apparatus is then in a condition for making a record of the ratio of the inputs to thermocouples 23 and 26. Switch 57 is then closed to again start chart motor 45 and switch 58 is closed to again start scanning motor 16. Thus a control cycle between recording cycles is completed by the proper operation of the cam control switches.

It is noted that a switch 88 is placed in line L² beyond the connections for the recorder motor 43. This switch is a limit switch that is operated when the prism has reached one end or the other of its travel. Normally, of course, this switch will be closed during the time that a scanning operation is taking place. A push button switch 89 is provided in parallel with switch 88 so that the prism switch can be bypassed if necessary, and a signal light 91 is provided to indicate when the prism limit switch is closed. It will be seen from the diagram that the scanning motor can be run at any time in either direction. For example, switch 63 is adjusted to determine the direction that the scanning motor is to rotate and switch 75 is adjusted to the right thus closing a circuit between wire 74 and wire 92 that parallels switch 58. The scanning motor will then be driven at any time that the prism limit switch is closed and may be driven manually by pushing button 89 if the prism limit switch is open. It will be noted that when switch 75 is moved to the right the chart motor circuit is broken. This prevents wasting of the chart during the time that the prism is being adjusted to a position in which it can again start its scanning operation.

There are also provided glow lights 93 to 96 inclusive which are energized through a transformer 97 the primary winding of which is connected across the line. The glow lights 93 to 96 are selectively connected in circuit with the transformer secondary winding and one of the switches 51 to 54 to indicate which of the motors is connected to the output of the recorder amplifier. These glow lights are connected individually in parallel circuits with the recorder motor, the preamplifier motors, and the slit width control motor so that an indication may be given as to which of these motors is energized at any particular time.

Figure 4:
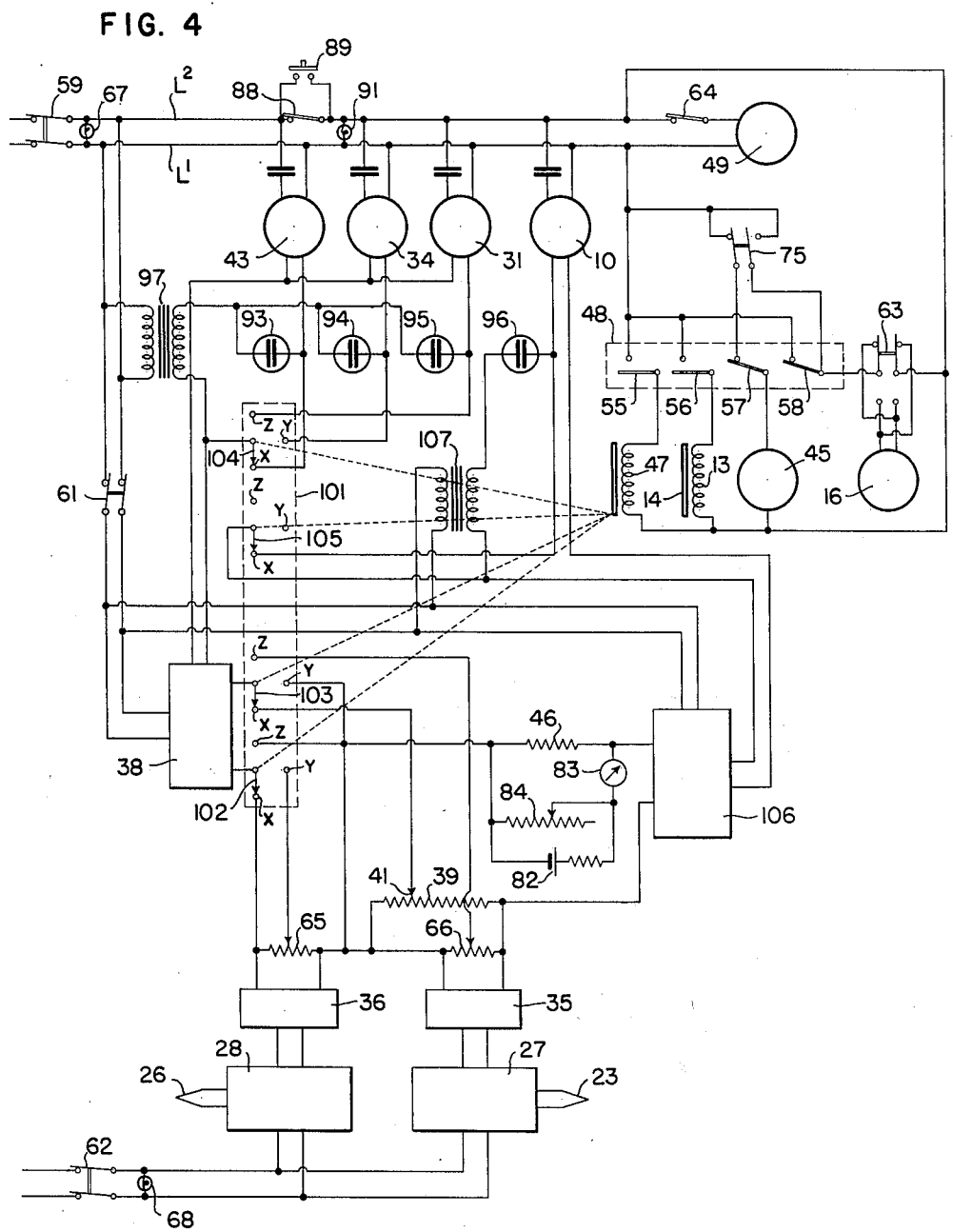
Figure 4 is a wiring diagram showing an embodiment of the invention in which the slit width is continuously adjusted.

The embodiment of the invention shown in Figure 4 differs from that shown in Figure 3, in that a separate amplifier is used so that the slit width motor 10 can be continuously adjusted during the time that the recording cycle is taking place, instead of as one of the steps in the control cycle. This necessitates a change in the switching operations that have been described above since the motor 10 which adjusts the slit width is to be continually energized all of the time that the recorder motor 43 is being operated. In order to accomplish this the rotary switch 37 having two banks of four stations each is done away with and a four bank rotary switch 101 with each bank having three stations is used in its place. This switch 101, however, is still actuated by the same solenoid 47. Also four of the cam actuated switches which control operations of four motors 10, 31, 34 and 43 have been done away with and these motors are controlled by two of the banks of switch 101.

Referring to Figure 4, it will be seen that those parts that have been previously described and which remain the same are given the same reference characters in this figure. In the normal operation of the device during the recording cycle the rotary switch contacts are in position x, as is shown in the drawing, and switches 57 and 58 are closed. When in position x contacts 102 and 103 connect amplifier 38 so that the ratio between the output of amplifier 28 and the output of amplifier 27 may be measured. In this position contact 102 is connected to the left end of resistance 65 and from there through resistance 39 to contact 41 and back to contact 103. At the same time upper contact 104 of switch 101 in its position x connects the output of amplifier 38 to motor 43 so that the recorder motor will run. While this is going on a second amplifier 106, similar to amplifier 38, has its input connected directly to resistance 46 and resistance 66 as is shown in the figure. One wire of the output of amplifier 106 is connected directly to one terminal of motor 10 while the other wire of this amplifier is connected through a contact 105 of switch 101 to the second terminal of motor 10. Thus during the time that the recorder motor is operating, amplifier 106 is continuously measuring the difference in the standard potential drop across resistance 46 and the potential drop across resistance 66 in the output from the standard preamplifier 27. As the energy level of the spectrum varies the potential drop across resistance 66 will vary from that across resistance 46 and amplifier 106 will energize motor 10 to properly adjust the slit width. During the time that the motor 10 is connected to the amplifier glow lamp 96 will be energized. This lamp is connected in parallel with a lead to motor 10 and across contact 105. When contact 105 is in position x a circuit through the lamp will be closed. The lamp is energized from the secondary of a transformer 107, the primary of which is connected across the power input terminals to amplifier 106.

When motor 49 has driven the cams to a position in which a control cycle is to take place, switches 55 and 56 will be closed and switches 57 and 58 will be opened. Closing of switch 56 energizes the shutter solenoid 13 to cut off any energy input to the system and momentary closure of switch 55 energizes solenoid 47 to shift the contacts of switch 101 from station x to station y. In this position of switch 101 contact 102 is connected to the contact engaging output resistance 65 of amplifier 28 and across the right portion of that resistance back to contact 103. Simultaneously contact 104 is moved to its station y so that motor 34 is connected to the output of amplifier 38 in lieu of motor 43. At this time standardization of the sample preamplifier 28 takes place.

When the sample amplifier has been standardized, switch 55 will again be momentarily closed. This moves the contacts of switch 101 from position y to their third position z. In this position contact 102 is connected to the left end of resistance 66 and the circuit extends from there through the left portion of resistance 66 to the contact engaging that resistance and from there back to contact 103 and the amplifier 38. At the same time contact 104 in its position z connects the output of the amplifier with motor 31 in lieu of motor 34 so that the reference preamplifier 27 may be recalibrated. It is noted that when the contacts of switch 101 are moved to their positions y and z that contact 105 does not complete any circuits since in those positions this contact is dead-ended, whereby motor 10 is deenergized.

After the reference preamplifier has been recalibrated switch 55 is again momentarily closed, switch 56 is opened, and switches 57 and 58 are closed. This moves the contacts of switch 101 back to position x so that the system is in a condition to make a record of the ratio of the outputs of the two preamplifiers. The parts stay in this position until it is again time for a control cycle to take place. It will be seen that, with the various components of the system connected as shown in Figure 4, the slit width will be adjusted continuously during the recording cycle and that the slit width adjusting motor will be disconnected during the time that a control cycle is taking place.

From the above description it will be seen that we have provided a control system so that a spectrograph may automatically be adjusted at predetermined intervals in order to keep this instrument in calibration. The control circuit is so set up that a predetermined sequence of adjustment is obtained for the instrument and so that the entire operation is automatic. Provision has been made for manually adjusting the scanning motor if it is desired so that the prism may be returned from time to time to a position in which a new cycle is started.

While, in accordance with the provisions of the statutes, we have illustrated and described the best form of our invention now known to us, it will be apparent to those skilled in the art that changes may be made in the form of the apparatus disclosed without departure from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a control system for a spectrograph having a recording mechanism including an amplifier and a motor, said spectrograph also having an adjusting and calibrating mechanism including a plurality of preamplifiers and a plurality of motors each connected to calibrate one of said preamplifiers, the combination of a pair of terminals adapted to be connected to a source of electricity, a plurality of electric circuits each adapted to connect electrically the input of the amplifier of said recording mechanism to the output of one of the preamplifiers of said adjusting and calibrating mechanisms and to connect the corresponding one of said motors to the output of said recording mechanism so that said motor is responsive to the output of said one of said preamplifiers and consequently calibrates said one preamplifier, a rotary switch having contacts in the said circuits to the input of the amplifier of said recording mechanism, a plurality of switches each connected in circuit with one of said motors so as to connect said motor in series with the output of the amplifier of said recording mechanism, a switch controlling the connection of said rotary switch to said terminals, for rotating said rotary switch, and for disconnecting said rotary switch from said terminals, and a continuously driven motor to open and close said switches (except said rotary switch) in a predetermined sequence.

2. In a spectrograph having a source of radiant energy, a first energy responsive device adapted to receive energy from said source, an energy absorbing device, a second energy responsive device adapted to receive energy from said source through said absorbing device, each of said responsive devices being adapted to produce an output voltage of a magnitude which is a function of the intensity of the energy reaching the device, adjustable means for controlling the intensity of the energy reaching said first responsive device and said absorbing device, control means operative, when actuated, to reduce the output voltage of each of said responsive devices substantially to zero, measuring means, a first amplifier having an input circuit to which is applied the output voltage of said first responsive device and having an output circuit, and a second amplifier having an input circuit to which is applied the output voltage of said second responsive device and having an output circuit, each of said amplifiers including adjustable zeroing means operative, when adjusted, to vary the output voltage in the output circuit of the corresponding amplifier, the improved control apparatus combination comprising a voltage responsive device having an input portion and an output portion and operative to produce a control effect in said output portion which is a function of the magnitude of a voltage applied to said input portion, adjustable circuit and switching means having a plurality of operating conditions and adapted in a first condition to apply solely at least a portion of the output voltage of said first amplifier to said input portion and simultaneously to couple said output portion solely to the zeroing means of said first amplifier to cause said control effect to control the adjustment of the last mentioned zeroing means, said circuit and switching means being adapted in a second condition to apply solely at least a portion of the output voltage of said second amplifier to said input portion and simultaneously to couple said output portion solely to the zeroing means of said second amplifier to cause said control effect to control the adjustment of the last mentioned zeroing means, said circuit and switching means being adapted in a third condition to apply at least portions of the output voltages of said amplifiers to said input portion and simultaneously to couple said output portion solely to said measuring means, operating means operative to adjust said circuit and switching means into said first, second, and third conditions, one at a time and in a predetermined sequence which is cyclically repeated, said operating means being adapted to actuate said control means to reduce the output voltages of said first and second responsive devices substantially to zero during the periods in which said circuit and switching means is in said first and second conditions, whereby said zeroing means are adjusted periodically as necessary to reduce the output voltages of said amplifiers substantially to zero for substantially zero output voltages of said first and second responsive devices, a source of standard voltage, said circuit and switching means being operative during predetermined, cyclically repeated periods of time to oppose at least a portion of the output voltage of said first amplifier to at least a portion of the voltage of said source of standard voltage, and other control means adapted during the last mentioned periods to control the adjustment of said intensity controlling means in accordance with the resultant of said opposed voltages, whereby the intensity of the energy reaching said absorbing device and said first responsive device is maintained substantially constant during said last mentioned periods.

3. Apparatus as specified in claim 2, wherein said last mentioned periods are distinct from those during which said circuit and switching means assumes said first, second, and third operating conditions, wherein said circuit and switching means is operative to assume a fourth operating condition solely during said last mentioned periods and is adapted, when in said fourth condition, to apply solely the last mentioned portion of the output voltage of said first amplifier and said portion of the voltage of said source of standard voltage in opposition to said input portion and simultaneously to couple said output portion solely to said other control means to cause said control effect to control the adjustment of said intensity controlling means.

4. Apparatus as specified in claim 2, wherein said last mentioned periods coincide with those during which said circuit and switching means assumes said third operating condition, wherein said other control means includes a second voltage responsive device having an input portion and an output portion and operative to produce a control effect in its output portion which is a function of the magnitude of a voltage applied to its input portion, and wherein said circuit and switching means is adapted, when in said third condition, to apply solely the last mentioned portion of the output voltage of said first amplifier and said portion of the voltage of said source of standard voltage in opposition to the input portion of said second voltage responsive device and simultaneously to couple the output portion of said second voltage responsive device to said intensity controlling means to cause the last mentioned control effect to control the adjustment of said intensity controlling means.

5. Apparatus as specified in claim 2, wherein each of said other control means, said zeroing means, and said measuring means includes a separate reversible electric motor individual to the associated means, wherein said voltage responsive device includes an electronic amplifying device, having an input circuit coupled to said input portion and having an output circuit, and includes a motor drive circuit having an input circuit coupled to the last mentioned output circuit and having an output circuit coupled to said output portion which in turn is coupled to said circuit and switching means, wherein the latter includes first, second, third, and fourth switches, each of which, when closed, is operative to connect the motor of said other control means, the motor of the zeroing means of said first amplifier, the motor of the zeroing means of said second amplifier, and the motor of said measuring means, respectively, to said output portion, wherein said operating means is operative to close only said second switch, only said third switch, and only said fourth switch during the periods in which said circuit and switching means respectively assumes said first, second, and third operating conditions, wherein said predetermined periods are distinct from the last mentioned periods, and wherein said operating means is operative to close only said first switch and said circuit and switching means is simultaneously operative to apply solely the last mentioned portion of the output voltage of said first amplifier and said portion of the voltage of said source of standard voltage in opposition to said input portion during said predetermined periods.

6. Apparatus as specified in claim 5, wherein there is included a separate indicating lamp individual to each of said motors and circuit means operative to cause illumination of whichever of said lamps is associated with a motor which is connected to the output circuit of said motor drive circuit.

7. In a spectograph having a source of radiant energy, a first energy responsive device adapted to receive energy from said source, an energy absorbing device, a second energy responsive device adapted to receive energy from said source through said absorbing device, each of said responsive devices being adapted to produce an output voltage of a magnitude which is a function of the intensity of the energy reaching the device, and adjustable means for controlling the intensity of the energy reaching said first responsive device and said absorbing device, the improved control apparatus combination comprising a source of standard voltage, a voltage responsive device having an input portion and an output portion and operative to produce a control effect in said output portion which is a function of the magnitude of a voltage applied to said input portion, circuit means operative to apply at least a portion of the voltage of said source of standard voltage and at least a portion of the output voltage of said first responsive device in opposition to said input portion, and means adapted to couple said output portion to said intensity controlling means and operative, when so coupled, to cause said control effect to control the adjustment of the last mentioned means, whereby the intensity of the energy reaching said absorbing device and said first responsive device is maintained substantially constant.

8. Apparatus as specified in claim 7, wherein said voltage responsive device includes an electronic amplifier, having an input circuit coupled to said input portion and having an output circuit, and includes a motor drive circuit having an input circuit coupled to the last mentioned output circuit and having an output circuit coupled to said output portion, and wherein there is included a reversible electric motor electrically connected to said output portion and adapted to be mechanically coupled to said intensity controlling means.

9. Apparatus as specified in claim 8, wherein said intensity controlling means comprises adjustable slit means having an adjustable opening through which said first responsive device and said absorbing device receive energy from said energy source, and wherein said motor is operative to adjust the dimensions of said opening.

10. In a spectrograph having a source of radiant energy, a first energy responsive device adapted to receive energy from said source, an energy absorbing device, a second energy responsive device adapted to receive energy from said source through said absorbing device, each of said responsive devices being adapted to produce an output voltage of a magnitude which is a function of the intensity of the energy reaching the device, control means operative, when actuated, to reduce the output voltage of each of said responsive devices substantially to zero, measuring means, a first amplifier having an input circuit to which is applied the output voltage of said first responsive device and having an output circuit, and a second amplifier having an input circuit to which is applied the output voltage of said second responsive device and having an output circuit, each of said amplifiers including adjustable zeroing means operative, when adjusted, to vary the output voltage in the output circuit of the corresponding amplifier, the improved control apparatus combination comprising a voltage responsive device having an input portion and an output portion and operative to produce a control effect in said output portion which is a function of the magnitude of a voltage applied to said input portion, adjustable circuit and switching means having a plurality of operating conditions and adapted in a first condition to apply solely at least a portion of the output voltage of said first amplifier to said input portion and simultaneously to couple said output portion solely to the zeroing means of said first amplifier to cause said control effect to control the adjustment of the last mentioned zeroing means, said circuit and switching means being adapted in a second condition to apply solely at least a portion of the output voltage of said second amplifier to said input portion and simultaneously to couple said output portion solely to the zeroing means of said second amplifier to cause said control effect to control the adjustment of the last mentioned zeroing means, said circuit and switching means being adapted in a third condition to apply at least portions of the output voltages of said amplifiers to said input portion and simultaneously to couple said output portion solely to said measuring means, and operating means operative to adjust said circuit and switching means into said first, second, and third conditions, one at a time and in a predetermined sequence which is cyclically repeated, said operating means being adapted to actuate said control means to reduce the output voltages of said first and second responsive devices substantially to zero during the periods in which said circuit and switching means is in said first and second conditions, whereby said zeroing means are adjusted periodically as necessary to reduce the output voltages of said amplifiers substantially to zero for substantially zero output voltages of said first and second responsive devices.

11. Apparatus as specified in claim 10, wherein each of said zeroing means comprises a source of standard voltage, a resistor connected across said source of standard voltage, a slider contact engaging and adjustable along said resistor, a reversible electric motor operative, when energized, to adjust said contact along said resistor, and means operative to connect one end of said resistor and said slider contact in a series circuit including the input circuit of the associated one of said amplifiers and the associated one of said first and second responsive devices, wherein said voltage responsive device includes an electronic amplifying device, having an input circuit coupled to said input portion and having an output circuit, and includes a motor drive circuit having an input circuit coupled to the last mentioned output circuit and having an output circuit coupled to said output portion, and wherein said circuit and switching means is operative to connect to said output portion the motor of the zeroing means of the one of said amplifiers which has its output voltage applied to said input portion, said motor drive circuit being operative to cause operation of the motor connected thereto whenever the output voltage of the corresponding one of said amplifiers is other than substantially zero.

12. Apparatus as specified in claim 11, wherein said measuring means includes a reversible electric motor, wherein said circuit and switching means includes first, second, and third switches, each of which, when closed, is operative to connect the motor of the zeroing means of said first amplifier, the motor of the zeroing means of said second amplifier, and the motor of said measuring means, respectively, to said output portion, and wherein said operating means is operative to close only said first switch, only said second switch, and only said third switch during the periods in which said circuit and switching means respectively assumes said first, second, and third operating conditions.

13. Apparatus as specified in claim 10, wherein said control means comprises a shutter member which is operative, when actuated, to interrupt the passage of energy from said source to said first and second responsive devices to a substantially complete extent.

RUDOLF F. WILD.
CLARENCE A. DYER.
J. C. MOUZON.
WALTER P. WILLS.

REFERENCES CITED

The following references are of record in the file of this patent:

UNITED STATES PATENTS

| Number | Name | Date |
|---|---|---|
| 1,799,134 | Hardy | Mar. 31, 1931 |
| 1,806,198 | Hardy | May 19, 1931 |
| 1,881,336 | Voigt | Oct. 4, 1932 |
| 1,894,132 | Stone | Jan. 10, 1933 |
| 1,919,182 | Fitzgerald | July 18, 1933 |
| 1,973,603 | Brandenburger | Sept. 11, 1934 |
| 2,109,222 | Ryder | Feb. 22, 1938 |
| 2,179,044 | Kriechbaum | Nov. 7, 1939 |
| 2,376,311 | Hood | May 15, 1945 |
| 2,388,105 | Wilson | Oct. 30, 1945 |
| 2,437,323 | Heigl et al. | Mar. 9, 1948 |
| 2,451,572 | Moore | Oct. 19, 1948 |
| 2,469,213 | Shea | May 3, 1949 |
| 2,503,165 | Meyer | Apr. 4, 1950 |

OTHER REFERENCES

A Versatile Infra-Red Spectrograph by A. Oetjen, Journal Optical Society of America, December 1945, pp. 743-754.